3,396,044
TEMPORARY HIGH TEMPERATURE PROTECTIVE
COATING AGENTS FOR METALS
Walter R. Satterfield, Ellicott City, Md., assignor, by mesne assignments, to SCM Corporation, New York, N.Y., a corporation of New York
No Drawing. Filed June 9, 1966, Ser. No. 556,274
14 Claims. (Cl. 106—66)

ABSTRACT OF THE DISCLOSURE

A particulate refractory composition adapted for forming a temporary protective coating for metal and comprising (a) at least one crystalline refractory oxide, (b) at least one crystalline metal salt of an oxy anion, and (c) from about 3 to about 20% of a glass frit having an interferometer softening temperature between about 1000° F. and about 1900° F. and containing not substantially more than 5 weight percent ZnO and 6 weight percent fluorine, is described. Coating formulations comprising the refractory composition and a fugitive diluent and coated metal articles containing the coating formulations are also described. The invention is advantageous in that it provides compositions and formulations which protect metal objects such as ingots, bars, billets and other configurations from metal loss when such objects are exposed to temperatures within the range of 1000° F. to about 2500° F. Prior to the present invention, no single ceramic composition has been available which (1) provides the high degree of protection to a variety of metal surfaces, and (2) which is also operable over the wide temperature range described above.

---

The invention relates to a novel refractory composition, to a coating formulation containing the refractory composition, and to metal articles coated with the formulation. The refractory composition and the coating formulation are useful in protecting the surfaces of metal against excessive scaling, oxidation, and corrosion during the handling and heat treatment of metal.

Much difficulty has been experienced in protecting oxidizable or corrosion-susceptible metal surfaces against deterioration and metal loss when such surfaces are subjected to heat treatment in the processing of metal ingots, bars, or billets, into different shapes or to achieve certain desirable metallurgical properties. During fabrication, the high temperatures involved often cause deleterious reactions, such as oxidation or decarburization, to occur unless preventive measure are employed. Such reactions which take place during heat treatment generally cause considerable metal loss in the ingot, bar or billet of the product formed.

One method of alleviating such loss has been through the use of a controlled atmosphere furnace. However, where the size of the metal workpiece is large, the cost of such procedure is usually prohibitive. Although protective mineral coatings have been applied to metals to protect their surfaces against metal loss, two distinct coatings (e.g. a base coating and top coating) have been generally required where the temperatures employed are above 2000° F.

The present invention is advantageous in that it provides compositions and formulations which protect metal objects such as ingots, bars, billets and other configurations from metal loss when exposed to temperatures in the range of from about 1000° F. to about 2500° F. Prior to the present invention, no single ceramic composition has been available which would provide the same degree of protection to various metal surfaces and be operational over such wide temperature range.

The phrase "refractory composition" as used herein is intended to mean and to include a three component system comprising:
(a) At least one crystalline refractory oxide;
(b) At least one crystalline metal salt of an oxy anion; and
(c) A vitreous material comprising a glass frit.

The phrase "coating composition" or "coating formulation" as used herein is intended to mean and to include formulations containing the refractory composition and a fugitive diluent such as a thermally decomposable solid binder (e.g. a resin or cellulosic gum) and/or an inert liquid such as water or an organic liquid, or a mixture of a solid binder and a liquid.

The present invention provides a particular refractory composition adapted for forming a temporary protective coating for metal and comprising an intimate blend of the following ingredients in the ranges listed below:

| | Weight percent |
|---|---|
| (a) Crystalline chromia | 40–85 |
| (b) Crystalline alkaline earth metal chromate | 3–15 |
| (c) Crystalline silica | 0–30 |
| (d) Crystalline aluminum silicate | 0–50 |
| (e) At least one crystalline, polyvalent, substantially water insoluble metal salt of an amphoteric metal oxy anion selected from the group consisting of molybdates, vanadates, zirconates, and hafniates | 0–10 |
| (f) Glass frit having an interferometer softening temperature between about 1000° F. and about 1900° F. and containing not substantially more than (a) about 5 weight percent ZnO, and (b) about 6 weight percent fluorine | 3–20 | wherein the above percentages total 100 percent.

Such particulate refractory compositions, when incorporated in coating formulations, provide protection to a wide variety of metals during heat treatment. They prevent metal loss which generally accompanies heat treatment and the economic disadvantages appertaining to such loss.

The particulate refractory composition is composed of finely divided particles of the components above described. Generally, the particles of the composition have an average size in the range of from about 5 to about 50 microns. The particle size may be readily attained by grinding the components during the blending operation in conventional grinding and blending apparatus such as a ball mill, rod mill, or the like.

Although compositions having an average particle size below about 5 microns may be readily obtained and employed, such compositions can represent an unnecessary expense because of the extended grinding times frequently required. Compositions having an average particle size above about 50 microns can also be employed although compositions containing these larger particles tend to settle out of coating formulations in which they are incorporated and require additional mixing. Also, coating formulations containing refractory compositions having a particle size above 50 microns sometimes tend to form films of undesirable thicknesses thereby causing needless consumption of the refractory composition.

It is especially desirable that the settling rates of each component of the refractory compositions be roughly about the same in suspended formulations to retard possible differential settling in such formulations. Usually, the mixing and comminuting operation of the several components of the refractory compositions produces a product that suspends stably in liquid coating formulations for prolonged periods.

The refractory composition employed can vary widely within the above described ranges with respect to the kind and quantity of ingredients employed. Broadly, the composition comprises a crystalline refractory oxide component, a second component comprising a water insoluble crystalline metal salt of an amphoteric oxy anion, and a vitreous or glass frit component.

As will be evident hereinafter, the quantity of frit, which is from about 3 to about 20 weight percent, will depend upon the intended use of the composition. For example, where the refractory composition is intended for use in coating tool steel at temperatures above about 2000° F., a lesser quantity of frit will be employed than where a stainless steel is to be coated. Generally, the higher the temperature employed, the lesser the amount of glass frit will be required. Advantageous refractory compositions are those which contain from about 6 to about 12 weight percent of the frit.

As previously noted, the frit has an interferometer softening temperature between about 1000° F. and 1900° F. This softening temperature range is important since the vitreous frit fuses with the crystalline refractory oxide and the crystalline metal salt to form an impervious continuous coating.

The composition of the frit can vary to some extent provided the interferometer softening temperature is between 1000° F. and 1900° F. and the frit contains no more than 5 weight percent ZnO and not more than 6 weight percent of fluorine. Frit compositions containing above about 5 weight percent of ZnO frequently have softening temperatures below 1000° F. When frit compositions contain more than 6 weight percent fluorine, there is some danger of fluorine liberation and attack of the coated metal. Frit compositions falling within the mole fraction ranges listed below have softening temperatures between 1000° F. and 1900° F. and have been found to be especially advantageous when employed in refractory compositions and coating formulations of this invention.

|  | Mole fraction |
|---|---|
| $Al_2O_3$ | 0.025–0.100 |
| $B_2O_3$ | 0.050–0.700 |
| $P_2O_5$ | 0–0.050 |
| $SiO_2$ | 0.20–0.60 |
| CaO | 0–0.08 |
| MgO | 0–0.30 |
| BaO | 0–0.20 |
| MnO | 0–0.02 |
| NiO | 0–0.02 |
| ZnO | 0–0.30 |
| $Na_2O$ | 0–0.2 |
| $ZrO_2$ | 0–0.020 |
| $CoO_3$ | 0–0.010 |
| $K_2O$ | 0–0.10 |
| $F_2$ | 0–0.06 | where the above fractions are a total of 1.

The refractory composition of this invention can also contain from about 40 to about 85 weight percent of crystalline chromia. The amount of chromia will generally depend upon the intended end use of the composition; that is, the particular metal and, concomitantly, the temperature at which the metal is to be treated. Generally, the higher concentrations of chromia will correspond to the metals requiring higher heat treating temperatures. If less than about 40 percent chromia is employed, coated articles are sometimes less than optimally protected. More than 85 percent chromia renders the refractory compositions economically unattractive.

In certain instances, particularly where higher temperatures are employed and metals which tend to be particularly susceptible to oxidation and corrosion are coated, it has been found desirable to employ, in addition to chromia, crystalline silica (e.g. quartz). When employed, the silica is preferably used in the range of from about 5 percent to about 20 percent; the higher quantities corresponding to the higher temperatures and/or relative susceptibility of the metal to heat corrosion.

It has also sometimes been found desirable to optionally employ up to about 50 weight percent of crystalline aluminum silicate in the refractory compositions. When employed, the amount of this material is preferably between about 10 to about 40 weight percent and usually replaces a portion of the chromia. Surprisingly, crystalline aluminum silicate has been found to be particularly effective in protecting reaction-susceptible metals, such as low carbon steels. Generally, the greater quantity of aluminum silicate employed will correspond to the degree of susceptibility of the metal to oxidation and/or decarburization reactions. A crystalline aluminum silicate which has been found to be advantageous is kyanite, a naturally occurring aluminum silicate mineral.

The compositions of this invention also contain from about 3 to about 15 weight percent of crystalline alkaline earth metal chromate. This component along with the crystalline chromia and frit are necessary components of the compositions of this invention and if the alkaline earth metal chromate is omitted from the compositions, significant metal loss will almost always occur. From about 5 to about 10 weight percent of such alkaline earth metal chromates have been found to provide compositions which are exceptionally effective in protecting metals and compositions containing alkaline earth metal chromate in these ranges are preferred. Although alkaline earth metal chromates, including barium, calcium, strontium, and magnesium chromates may be employed, barium chromate has been found to be particularly advantageous and is preferred.

Although more than about 15 percent by weight of alkaline earth metal chromates may be employed, there is usually no advantage and there is economic disadvantage. As will be hereinafter evident, less than 3 weight percent of alkaline earth metal chromate may be employed. However, there is usually no advantage, and the compositions containing less than 3 weight percent require other crystalline metal salts which are usually more expensive than the metal chromates.

The compositions of this invention can optionally contain a crystalline, polyvalent, substantially water insoluble metal salt of an amphoteric metal oxy anion selected from the group consisting of molybdates, vanadates, zirconates, and hafniates. Examples of such metal salts include the alkaline earth metals, lead, copper and zinc molybdates, vanadates, zirconates, and hafniates. These salts along with the alkaline earth metal chromate are believed to function as fluxes in the compositions. A particularly advantageous embodiment of such water insoluble metal salts of an amphoteric metal oxy anion is a commercial product known in the art as molybdate orange and comprises finely divided lead chromate crystals on which there has been precipitated between about 10 to 15 weight percent of lead molybdate micro-crystals. The amount of the above described salts can vary, but is preferably from about 2 to 3 weight percent of refractory composition. Where temperatures above about 1800° F. are employed in treating metals, the inclusion of these salts is sometimes unnecessary. However, where lower treating temperatures are employed (e.g. temperatures below the 1800° F. range) up to 10 weight percent of these salts may be employed. Larger quantities of these salts render the refractory compositions economically disadvantageous.

Advantageous refractory compositions falling within the scope hereinbefore described are characterized in having an average particle size of between about 5 to about 50 microns and an apparent density in the range of from about 2 to about 8 grams per cubic centimeter. Such refractory compositions are suspendable in diluents comprising inert liquids or inert liquids containing bodying agents and film-forming materials. When suspended, the refractory compositions form stable coating compositions and are suitable for application to metal surfaces.

After the coatings are dried, they protect such metal surfaces from metal loss due to corrosion, oxidation, decarburization, and the like significantly better than previously known single coat compositions at temperatures up to 2400° F. and above.

The novel refractory compositions of this invention are employed in the coating formulations or compositions hereinbefore referred to. Broadly, these coating compositions comprise the aforedefined refractory compositions and a fugitive diluent. The fugitive diluent can be a solid, liquid, or a solid dissolved in a liquid. The amount of fugitive diluent, whether in liquid or solid phase, is usually present in between about 1 to about 200 weight parts of diluent per 100 weight parts of refractory composition. When the fugitive diluent is a solid or in the solid phase, it is usually present in an amount between about 1 to about 15, preferably about 3 to about 10 weight parts per 100 weight parts of the composition. These solid fugitive diluents can serve as organic binding agents and can also act as film-forming agents when the coating composition also contains liquid diluents and is in liquid form. When the fugitive diluent is a liquid, it is generally present in an amount of from about 50 to about 200 weight parts per 100 weight parts of refractory composition. When the fugitive diluent is a solid dissolved in a liquid, the solid fugitive diluent is usually present in the same amount as when the fugitive diluent is present as the sole diluent and is in the solid phase.

Examples of solid phase fugitive diluents include cellulosic gums such as methyl cellulose, hydroxyethyl cellulose, carboxymethyl cellulose, gum arabic, gum tragacanth, etc. These solid fugitive diluents are actually organic binding agents and can be employed alone, but are preferably used in conjunction with inert liquid fugitive diluents comprising water, an organic liquid, or a mixture of water and an organic liquid.

Examples of other solid phase fugitive diluents (which are also organic binding agents) employed in conjunction with inert organic liquids include resinous products such as casein and glue, as well as synthetic resinous products such as for example polyolefins (e.g. polyethylene, polypropylene, polyvinyl alcohol) and esters of such alcohols including polyvinyl chloride and polyvinyl acetate, phenolic resins, urea formaldehyde and melamine formaldehyde resins, acrylic and methacrylic resins, alkyd resins, styrenated alkyd resins, furfuryl resins, and the like. These resins may be used singly or in various combinations depending upon the character of the coating desired and the end use intended.

The liquid fugitive diluent employed may be any of a wide variety of inert liquids (e.g. liquids which are nonreactive with respect to the refractory composition components and the solid fugitive diluents). Examples of such inert liquids include water, and organic liquids including liquid hydrocarbons such as petroleum naphtha boiling within the range of 100°–450° F., petroleum ether, pentane, hexane, heptane, octane, and the like; alkanols include methyl, ethyl, and propyl, isopropyl, n-butyl, t-butyl, and sec-butyl alcohols; ketones including acetone, methylethyl ketone, methylisobutyl ketone, etc.; aromatic organic liquids including xylene, toluene, and mixtures thereof sold as commercial products and the like.

As will be evident from the specific examples, the particular fugitive diluent or combination thereof employed will depend upon the end use desired (e.g. the kind of metal workpiece to be treated and the treatment temperature). Usually, when only a solid phase fugitive diluent is employed, such coating compositions are usually further modified by the inclusion of an inert liquid diluent prior to use. The precise combination of fugitive diluents will also depend to some extent upon the thickness of the coating which it is desired to deposit on the metal workpiece. If too large a quantity of solid fugitive diluent (e.g. organic binder) is employed, the coatings will usually become porous during the heat treating operation and will lose some of their protective qualities. It is thus seldom desirable to employ more than 15 weight parts of organic binding agent per 100 parts of refractory composition. If less than about 1 part of organic binder per 100 parts of refractory composition is employed, the resultant coating will sometimes tend to break and spall off before the heat treating operation is completed. If an excessive amount (e.g. more than 200 weight parts per 100 parts of refractory composition) of liquid fugitive diluent is employed, drying times of the coating compositions may be unduly prolonged and the resultant coating is sometimes too thin to provide adequate protection to the coated metal workpiece. If too little an amount (e.g. less than 50 parts per 100 parts of refractory composition) of liquid diluent is employed, the coatings will tend to be unduly thick and will result in the consumption of unnecessary large quantities of refractory composition. Preferably, the composition will be a liquid and will contain a sufficient solids content including organic binding agent and refractory composition to provide a coating which when dried and prior to heat treatment is from about 1 to about 20 mils in thickness. This can often be achieved, particularly in aqueous systems, by providing a bodying agent such as a siliceous clay or other thickening agent and in the case of organic liquid systems, a gellant such as modified magnesium montmorillonite. The bodying agent may also simultaneously be present as and perform the function of an organic binder.

The coating compositions above described are usually applied to surfaces of the metal workpiece and air dried either at room temperature or in ovens at temperatures from about 150° F. to about 300° F. When dried, the workpieces may be stored for prolonged periods prior to their introduction into a furnace for heat treating or hot working.

The metal workpiece may be coated with the coating compositions of this invention by a wide variety of methods such as dipping, brushing, rolling, spraying, or the like. When coated, workpieces are prepared which are suitable for working at temperatures between about 1000° F. and about 2500° F. and have on their surfaces an ostensibly dry deposit of refractory coating comprising a composition falling within the scope hereinbefore described.

The word "dry" as used herein is intended to mean and to refer to coated metal workpieces which have been dried to constant weight at 200° F.

The dry coatings, when applied to metal workpieces which are heat treated, fuse during the heat treating operation. Upon cooling of the heat-treated workpiece, the fused coatings spall; that is, they separate at the interface of the metal and the fused composition and are readily removed from the metal surface.

The following specific examples are intended to illustrate the invention but not to limit the scope thereof, parts and percentages being by weight unless otherwise indicated.

EXAMPLE 1

Ten compositions were prepared by intimately admixing the ingredients in Table I below in the amounts and percentages indicated therein. The average particle size of the particles of the compositions varied between about 5 and 50 microns and had apparent densities varying between 2 to 8 grams per cubic centimeter.

TABLE I.—REFRACTORY COMPOSITIONS

| Ingredients | Quantities in Percent by Weight | | | | | | | | | |
|---|---|---|---|---|---|---|---|---|---|---|
| | 1 | 2 | 3 | 4 | 5 | 6 | 7 | 8 | 9 | 10 |
| Chromia | 47 | 82 | 64 | 74 | 54 | 54 | 50 | 50 | 50 | 50 |
| Kyanite | 40 | | 23 | | 30 | 30 | 30 | 20 | 10 | |
| Opal Silica | | 12 | | 17 | | | | 10 | 20 | 30 |
| BaCrO$_4$ | 10 | | 7 | | 5 | 5 | 5.5 | 5.5 | 5.5 | 5.5 |
| Molybdate Orange | | 3 | | 3 | 2 | 2 | 2.5 | 2.5 | 2.5 | 2.5 |
| Glass A | | | 6 | 6 | | 9 | 12 | 12 | 12 | 12 |
| Glass B | 3 | 3 | | | 9 | | | | | |

Analysis of the glass frit compositions given as mol fractions are listed in Table II.

TABLE II.—GLASS COMPOSITIONS

| Ingredient | Mole Fractions | | | |
|---|---|---|---|---|
| | A | B | C | D |
| $Al_2O_3$ | 0.064 | 0.0993 | 0.042 | 0.032 |
| $B_2O_3$ | 0.635 | 0.1331 | 0.145 | 0.064 |
| $P_2O_5$ | | | 0.010 | |
| $SiO_2$ | 0.238 | 0.4576 | 0.302 | 0.535 |
| $CaO$ | | 0.0217 | 0.068 | 0.055 |
| $MgO$ | 0.063 | | | |
| $BaO$ | | | 0.136 | 0.054 |
| $MnO$ | | | 0.014 | |
| $NiO$ | | | 0.012 | |
| $ZnO$ | | 0.0436 | | 0.251 |
| $Na_2O$ | | 0.1614 | 0.134 | |
| $ZrO_2$ | | | | 0.009 |
| $CoO_3$ | | | 0.006 | |
| $K_2O$ | | 0.0496 | 0.085 | |
| $F_2$ | | 0.0337 | 0.046 | |
| Maturing Range | (1) | (2) | (3) | (4) |

1 Medium high.  3 Low.
2 Medium low.   4 High.

EXAMPLE 2

Compositions one through ten were dispersed in water to provide ten dispersions containing 100 weight parts of composition and 100 weight parts of water. Certain of the dispersions (indicated below) were applied as coatings to five types of three inch long steel rods to provide a coating of 6 mils in thickness on each rod. The coatings were air dried. Control rods of each type of steel were coated with a commercial double coat system and one rod from each group was left uncoated. The rods were charged into an electric furnace and exposed for three hours at 2250° F. The rods which had been weighed prior to coating were removed from the furnace and the coatings removed from the rods which were again weighed. The weight loss indicates attack on the metal by the heat and the loss for each rod is shown in Table III below.

TABLE III.—WEIGHT LOSS IN FIVE TYPES OF COATED STEELS EXPOSED FOR THREE HOURS AT 2,250° F.

| Steel Type | Composition No. | Weight Loss (Percent) |
|---|---|---|
| 304(a) | 5 | 0.6 |
| 304(a) | 4 | 1.0 |
| 304(a) | 1 | 2.5 |
| 304(a) | 1 D | 1.0 |
| 304(a) | 2 C | 10.0 |
| 416(b) | 5 | 0.8 |
| 416(b) | 4 | 1.0 |
| 416(b) | 2 | 1.5 |
| 416(b) | 1 D | 4.5 |
| 416(b) | 2 C | 16.0 |
| M-1(c) | 9 | 7.5 |
| M-1(c) | 4 | 7.0 |
| M-1(c) | 1 | 8.0 |
| M-1(c) | 1 D | 17.0 |
| M-1(c) | 2 C | 15.0 |
| 4340(d) | 5 | 10.0 |
| 4340(d) | 3 | 5.5 |
| 4340(d) | 2 | 8.0 |
| 4340(d) | 1 D | 26.0 |
| 4340(d) | 2 C | 14.0 |
| 1018(e) | 6 | 13.0 |
| 1018(e) | 3 | 13.0 |
| 1018(e) | 2 | 12.0 |
| 1018(e) | 1 D | 27.0 |
| 1018(e) | 2 C | 15.0 |

1 Commercial double coat.
2 Uncoated control.
(a) Stainless steel.
(b) Stainless steel.
(c) Tool steel.
(d) Nickel alloy steel.
(e) Low carbon steel.

The data in Table III demonstrates the effectiveness of the various compositions on the identified types of commercial steels which are heat treated and are compared with a commercial double coat (e.g. a base coat and a top coat) and uncoated steel rods which served as controls. From the data, it is seen that the compositions were effective in protecting the steel rods against metal (weight) loss. Some compositions were more effective than others and the effectiveness of a particular composition is dependent to some extent on the type of steel which is heat treated.

Aqueous coating compositions were also prepared in which 4 grams of methyl cellulose were dispersed in water prior to the addition of the refractory composition. When applied to coat steel, these compositions protected the metals to substantially the same extent as the aqueous suspensions. Such compositions may be stored without danger of the settling out of refractory components.

EXAMPLE 3

The following example demonstrates a preferred coating formulation containing a mixture of a refractory composition, solid fugitive diluents (e.g. organic binders), and organic liquid diluents.

Seven hundred grams of composition number 1 of Example 1 were charged to a ball mill to which was added the following liquid formulation:

TABLE IV

| Ingredient | Grams | Milliliters |
|---|---|---|
| Bentone 38 [1] | 9 | |
| Solvesso 100 [2] | | 63 |
| Styrenated alkyd resin [3] | 21 | |
| Denatured Alcohol (2A) | | 11 |

[1] A commercial gellant, described as an organic derivative of magnesium montmorillonite, a product of National Lead Company having a Sp. Gr. (typical) 1.8, coarse particles after dispersion 8.0% (maximum); chloride content 0.5% (maximum); gel strength (2% dispersed into toluene-methanol) and measured on a Brookfield viscosimeter at 50 r.p.m. is 220 cps. (minimum).
[2] Solvesso is the trademark for an aromatic hydrocarbon solvent. Solvesso 100 is an aromatic hydrocarbon solvent having a Sp. Gr. of 0.863–0.874, a boiling point range of 310–319° F., a flash point of 105° F. (minimum), and an aromatic content of 88.4–93.3%.
[3] A styrenated alkyd resin dispersed in VMP naphtha; the dispersion containing 51% solids, the resin being the reaction product of soya oil, phthalic acid, pentaerytyritol and glycerin having an acid number of 4. The dispersion has a Gardner-Holdt viscosity of $Z_2$-$Z_3$.
[4] VMP Naphtha S; an aliphatic hydrocarbon cut having a distillation range of 248°–254° F. and a flash point (closed cup) of 53° F.

The ingredients were milled for 30 minutes, after which a liquid formulation having the below listed ingredients was charged to the ball mill.

TABLE V

| Ingredient | Grams | Milliliters |
|---|---|---|
| Styrenated alkyd [3] | 36 | |
| Naphtha [4] | | 105 |
| Xylene | | 38 |
| Methylethyl Ketoxime | 0.6 | |
| Cobalt Tallate | 0.3 | |

See footnotes at bottom of Table IV.

The resultant mixture was then blended for 16 hours in the ball mill after which the contents were removed and further diluted with a mixture of 65 milliliters of aromatic solvent (Solvesso 100) and 22 milliliters of xylene.

The coating composition was applied to a series of weighted steel rods substantially identical to the steel rods employed in Example 2 by dipping the rods in the composition.

The coated rods were dried and the coating thicknesses were measured and found to vary between 5 to 7 mils.

The rods were then placed in a muffle furnace in which a temperature of 2400° F. was maintained. After two hours, they were withdrawn, cooled, and the weight loss measured. In every instance, the weight loss was less than half the weight loss of uncoated control rods and substantially less than rods coated with a commercial two-coat mineral compositions system.

EXAMPLE 4

The procedure of Example 3 was repeated except that 700 grams of refractory composition number 2 prepared in Example 1 was used in place of the refractory composition employed in Example 3. A series of substantially identical steel rods were coated with the formulation. The thicknesses of the dried coatings on the rods were measured and found to be 6–7 mils. The coated rods were subjected to substantially the same treatment as in Example 3. The protection against weight loss was in the order of magnitude of the protection afforded by the coating composition of Example 3.

EXAMPLE 5

The procedure of Example 3 was repeated except that 700 grams of refractory composition number 3 prepared in Example 1 was used in place of the refractory composition employed in Example 3. A series of substantially identical steel rods were coated with the formulation. The thicknesses of the dried coatings were determined to be between 7 and 8 mils. The coated rods were subjected to substantially the same treatment accorded the rods of Example 3. Excellent protection against weight loss caused by the heat treatment was evident in the rods coated with this formulation.

EXAMPLE 6

The procedure of Example 3 was repeated except that 700 grams of composition number 4 prepared in Example 1 was used in place of the refractory composition employed in Example 3. A series of substantially identical steel rods were coated with the formulation. The thicknesses of the dried coatings were determined to be 5-6 mils. The coated rods were subjected to substantially the same treatment as in Example 3 and substantially the same protection of the steel rods against weight loss was obtained.

EXAMPLE 7

The procedure of Example 3 was repeated except that 700 grams of refractory composition number 6 prepared in Example 1 was used in place of the refractory composition employed in Example 3. A series of substantially identical steel rods were coated with the formulation. The thicknesses of the dried coatings were determined to be 8-9 mils. The coated rods were subjected to substantially the same treatment as in Example 3 and substantially the same protection of the steel rods against weight loss was found.

EXAMPLE 8

The procedure of Example 3 was repeated except that 700 grams of refractory composition number 8 prepared in Example 1 was used in place of the refractory composition employed in Example 3. A series of substantially identical steel rods were coated with the formulation. The thicknesses of the dried coatings were determined to be 6-7 mils. The coated rods were subjected to substantially the same treatment as in Example 3 and substantially the same protection of the steel rods against weight loss was found.

In the foregoing examples it has been found possible to substitute other bodying agents, as for example fuller's earth, in place of the Bentone 38 employed in the compositions of these examples. In the foregoing Examples 3 through 8, the alkyd resin has been substituted with a resin comprising a non-anionic alkaline aqueous emulsion of an acrylic ester polymer.

In the protective coatings above described, the organic binding agent, whether it be a cellulosic gum or a polymer, should preferably be halogen-free to avoid the possibility of the in situ formation of hydrogen halides which tend to react with the metals. The protection afforded the metals by the coating compositions of this invention is primarily due to the refractory composition hereinbefore described. The use of these refractory compositions in coating formulations eliminates the necessity of employing double coat ceramic systems while simultaneously providing greater protection to the metal surfaces than such commercial two-coat systems. As the coated metal rods are cooled, the coating separates from the surface of the metal rod due to unequal coefficient of expansion of the metal and the coating. The coatings then spall from the metal and are thus easily removed from the heat worked or heat treated metal product. Inspection of the surface seems to indicate that a thin interfacial chemical reaction takes place between the surfaces of the metal and the internal surfaces of the dried coating which, in itself, might function or aid in protecting the metal against loss.

What is claimed is:

1. A particulate refractory composition adapted for forming a temporary protective coating for metal, said composition comprising an intimate blend of the following ingredients in the ranges listed below:

| | Weight percent |
|---|---|
| (a) crystalline chromia | 40–85 |
| (b) crystalline alkaline earth metal chromate | 3–15 |
| (c) crystalline silica | 0–30 |
| (d) crystalline aluminum silicate | 0–50 |
| (e) at least one crystalline polyvalent substantially water insoluble metal salt of an amphoteric metal oxy anion selected from the group consisting of molybdates, vanadates, zirconates, and hafniates | 0–10 |
| (f) glass frit having an interferometer softening temperature between about 1000° F. and about 1900° F. and containing not substantially more than (1) about 5 weight percent ZnO, and (2) 6 weight percent fluorine | 3–20 | wherein the above percentages total 100 percent; said glass frit having the following oxide composition falling within the mol fraction ranges listed below:

| | Mol fraction |
|---|---|
| $Al_2O_3$ | 0.025–0.100 |
| $B_2O_3$ | 0.050–0.700 |
| $P_2O_5$ | 0–0.050 |
| $SiO_2$ | 0.20–0.60 |
| CaO | 0–0.08 |
| MgO | 0–0.30 |
| BaO | 0–0.20 |
| MnO | 0–0.02 |
| NiO | 0–0.02 |
| ZnO | 0–0.30 |
| $Na_2O$ | 0–0.2 |
| $ZrO_2$ | 0–0.020 |
| $CoO_3$ | 0–0.010 |
| $K_2O$ | 0–0.10 |
| $F_2$ | 0–0.06 | wherein the above fractions are a total of 1.

2. The composition of claim 2 wherein the crystalline alkaline earth metal chromate is barium chromate.

3. A temporary protective coating for metal comprising the composition of claim 1 and a fugitive diluent.

4. The composition of claim 3 wherein said diluent is in the solid phase.

5. The composition of claim 3 wherein said diluent is in the liquid phase.

6. The composition of claim 5 wherein said diluent contains a bodying agent.

7. The composition of claim 6 wherein said diluent has binder properties and is substantially halogen free.

8. A coating composition comprising the composition of claim 1 and from about 1 to about 15 weight parts of an organic binding agent per 100 weight parts of said composition.

9. The composition of claim 8 dispersed in an inert liquid there being from about 0.5 to about 2 weight parts of said liquid per weight part of said composition.

10. The composition of claim 8 wherein the organic binding agent is resinous.

11. The composition of claim 8 wherein the organic binder is a cellulosic gum.

12. The composition of claim 9 wherein said liquid comprises water.

13. The composition of claim 9 wherein said liquid comprises an organic liquid.

14. A metal workpiece prepared for working at a temperature between about 1000° F. and about 2500° F., said workpiece having on the surface thereof an ostensibly dry deposit of refractory coating, said refractory coating comprising the composition of claim 1.

(References on following page)

References Cited

UNITED STATES PATENTS

| | | |
|---|---|---|
| 2,515,788 | 7/1950 | Morrill. |
| 3,178,321 | 4/1965 | Statterfield. |
| 3,184,320 | 5/1965 | Michael ------------ 106—49 |
| 3,197,291 | 7/1965 | Michael. |
| 3,200,016 | 8/1965 | Sharav et al. |
| 3,203,815 | 8/1965 | Michael. |

JAMES E. POER, *Primary Examiner.*